United States Patent [19]

Anderson

[11] Patent Number: 5,358,975
[45] Date of Patent: Oct. 25, 1994

[54] ORGANOSILOXANE ELASTOMERIC FOAMS

[75] Inventor: Dorian Anderson, Wiesbaden, Fed. Rep. of Germany

[73] Assignee: Dow Corning Limited, Barry, Wales

[21] Appl. No.: 96,288

[22] Filed: Jul. 26, 1993

[30] Foreign Application Priority Data

Aug. 13, 1992 [GB] United Kingdom ............ 9217151.1

[51] Int. Cl.$^5$ ................................................ C08J 9/02
[52] U.S. Cl. ...................................... 521/77; 521/87; 521/116; 521/154; 521/134
[58] Field of Search ............... 521/154, 134, 77, 87, 521/116

[56] References Cited

U.S. PATENT DOCUMENTS

| | | | |
|---|---|---|---|
| 3,070,555 | 12/1962 | Bruner, Jr. ............... | 260/2.5 |
| 4,026,842 | 5/1977 | Lee et al. ................ | 260/2.5 S |
| 4,026,845 | 5/1977 | Kim et al. ............... | 260/2.5 S |
| 4,418,157 | 11/1983 | Modic .................... | 521/82 |
| 4,590,222 | 5/1986 | Bauman .................. | 521/88 |
| 4,593,049 | 6/1986 | Bauman et al. ........ | 521/99 |
| 4,840,974 | 6/1989 | Gross et al. ............ | 521/85 |
| 4,851,452 | 7/1989 | Gross et al. ............ | 521/134 |
| 4,871,781 | 10/1989 | Weise .................... | 521/88 |
| 4,871,782 | 10/1989 | Modic et al. .......... | 521/88 |
| 5,011,865 | 4/1991 | Johnson ................. | 521/82 |
| 5,017,624 | 5/1991 | Johnson ................. | 521/154 |
| 5,071,885 | 10/1991 | Johnson ................. | 521/82 |

FOREIGN PATENT DOCUMENTS 1522637 of 0000 United Kingdom .

*Primary Examiner*—Morton Foelak
*Attorney, Agent, or Firm*—Robert Spector

[57] ABSTRACT

Method for the production of organosiloxane elastomeric foam comprising mixing together (A) a polydiorganosiloxane having at least two silicon-bonded alkenyl groups, (B) an organohydrogensiloxane, (C) a platinum catalyst, (D) an α, w-diol of formula HOROH wherein R represents an alkylene group having 3 to 7 carbon atoms and (E) a resin copolymer of R'$_3$SiO$_{0.5}$ units and SiO$_2$ units, R' being selected from methyl and vinyl, and thereafter allowing the mixture to foam and cure.

6 Claims, No Drawings

ORGANOSILOXANE ELASTOMERIC FOAMS

This invention relates to organosiloxane elastomeric foams.

Elastomeric sponges prepared by foaming organosiloxane compositions have long been known in the silicone art. For example, U.S. Pat. No. 3,070,555 discloses a method of preparing an organosiloxane foam in which an organopolysiloxane containing silicon-bonded hydroxyl groups and silicon-bonded hydrogen atoms is reacted with a hydroxylated compound, such as water or an alcohol, in the presence of a catalyst which is a stannous salt of a carboxylic acid. More recently, in G.B. Patent 1 522 637 there was disclosed a method of preparing a fire retardant organosiloxane foam which comprises mixing at ambient temperature (1) an organohydrogensiloxane, (2) a hydroxylated organosiloxane, (3) a platinum catalyst and, optionally, (4) a benzene-soluble vinyl-containing triorganosiloxy-terminated polydiorganosiloxane, and thereafter allowing a foam to form. A modification of the process of G.B. Patent 1 522 637 is described in U.S. Pat. No. 4,026,842 according to which foams having an open-cell structure are obtained if there is present in the foamable mixture an organomonohydrogensiloxane.

U.S. Pat. No. 4,871,782 discloses a foamable composition having a low viscosity and which does not split and tear during foaming. The composition comprises (a) 100 parts by weight of a mixture of vinyl end-capped polysiloxanes, (b) from 1 to 50 parts of a polysiloxane having silicon-bonded hydrogen atoms, (c) a hydroxyl source selected from water, organic alcohols and hydroxylated siloxanes and (d) a platinum catalyst. Organic alcohols specifically disclosed include ethanol, propanol and ethylene glycol. For certain applications, for example seat cushions, it is desirable that the cured foam has a relatively low density coupled with high resiliency. A method for reducing the density of silicone foams is disclosed in U.S. Pat. No. 4,840,974 in which the catalyst used is a mixture of a platinum vinyl siloxane and a platinum triarylphosphine. U.S. Pat. Nos. 5,011,865 and 5,017,624 disclose processes for preparing foams of reduced density by incorporating inter alia an aqueous buffer solution and water and/or an organic alcohol. Alcohols specifically referred to include methanol, which is preferred, ethanol and ethylene glycol. Another method of producing organic siloxane elastomeric foams of reduced density is disclosed in U.S. Pat. No. 4,026,845 wherein a fluorinated surfactant is mixed with a foamable composition comprising a hydroxylated organosiloxane, an organohydrogensiloxane and a platinum catalyst. A fluorinated surfactant is also employed in the compositions of U.S. Pat. No. 4,593,049 which discloses a method of producing silicone elastomeric foams in which the properties are controlled.

U.S. Pat. No. 4,590,222 teaches a method of controlling a combination of physical properties of a silicone elastomeric foam in which there is incorporated into the foamable mixture from 1 to 15 parts of an organic alcohol having from 3 to 12 carbon atoms.

The use of an alcohol, for example propanol, in conjunction with a fluorinated surfactant or a hydroxyl end-blocked polydiorganosiloxane can result in generally acceptable foamed products. However, the fluorinated surfactants are expensive and the presence of high proportions of hydroxyl end-blocked polydiorganosiloxanes has been found to be undesirable when foams of high strength are required.

Yet another method of producing foams of reduced density is disclosed in U.S. Pat. No. 4,871,781 which is concerned with compositions consisting essentially of (A) polydiorganosiloxanes having vinyl groups, (B) polyorganohydrogensiloxanes having certain terminal groups, (C) a platinum catalyst and (D) a saturated polyhydric alcohol which is free of Si atoms and contains at least two hydroxyl groups per molecule. According to the Example therein the foams have a density of about 500 kg/m³.

U.S. Pat. No. 4,418,157 discloses a method of reducing the density of a silicone foam which comprises mixing with a foamable composition having a polydiorganosiloxane base polymer, an organohydrogensiloxane and a platinum catalyst, an amount of a resinous copolymer containing $R_3SiO_{0.5}$ and $SiO_2$ units in which R is selected from the group consisting of for example alkyl radicals, aryl radicals and the vinyl radical. The foams prepared according to the Examples have densities ranging from 300 kg/m³ to 411 kg/m³.

While the known prior art methods effect a reduction in the density of the foam there is a continuing search for means of producing silicone foams having even lower densities, for example of the order of 150 to 200 kg/m³. Surprisingly we have now found that such foams may be obtained provided that there is incorporated into the foamable composition both a resinous copolymer and an organic alcohol which is selected from a narrow range of α, w-diols.

Accordingly this invention provides a method for the production of an organosiloxane elastomeric foam which comprises mixing together (A) a triorganosiloxy end-blocked polydiorganosiloxane wherein the organic substituents are selected from alkyl and halogen-substituted alkyl groups having from 1 to 6 carbon atoms, phenyl groups and alkenyl groups having from 2 to 6 carbon atoms, there being an average of at least two alkenyl groups per molecule and at least 80 percent of the total substituents being methyl, (B) an organohydrogensiloxane having on average at least three silicon-bonded hydrogen atoms per molecule and wherein the organic substituents are selected from the group consisting of alkyl groups having from 1 to 6 carbon atoms and the phenyl group, (C) a platinum catalyst in an amount sufficient to provide from 5 to 200 parts by weight of Pt per million parts of the combined weights of (A) and (B), (D) an α, w-diol of the general formula HOROH wherein R represents an alkylene group having from 3 to 7 carbon atoms, and (E) from 10 to 35 parts by weight per 100 parts of the combined weights of (A) and (B) of a resinous copolymer containing $R'_3SiO_{0.5}$ units and $SiO_2$ units wherein the R' substituents are selected from methyl groups and vinyl groups, at least 1% and up to 20% of the total R' groups being vinyl and thereafter allowing the mixture to foam and cure.

The triorganosiloxy end-blocked polydiorganosiloxanes (A) are well-known materials, as is their use in the production of organosiloxane elastomeric foamed products. At least 80 percent of the total number of silicon-bonded substituents should be methyl and at least two silicon-bonded substituents are alkenyl having from 2 to 6 carbon atoms, for example vinyl, allyl or hexenyl. Any remaining substituents are selected from phenyl groups and alkyl and halogen-substituted alkyl groups having from two to six carbon atoms, for example ethyl, propyl, pentyl and trifluoropropyl. The alkenyl groups may be attached to terminal silicon atoms or to non-terminal silicon atoms, or to both. The preferred polydiorganosiloxanes (A) are the vinyl-terminated polydiorganosiloxanes of the formula

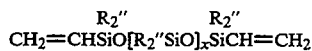

wherein each R" represents an organic substituent as defined hereinabove and x is an integer.

The viscosity of the polydiorganosiloxane (A) is not critical and may vary from as low as 20 mm$^2$/s to 10$^6$ mm$^2$/s at 25° C. The integer x is such as to provide the desired viscosity and may therefore have a value from about 20 to about 2500. If desired, to facilitate processing or to attain specific properties in the foam the polydiorganosiloxane (A) may comprise two or more organosiloxane polymers having for example different viscosities, organic substituents or alkenyl content. Preferably the polydiorganosiloxane (A) has a viscosity within the range from about 1000 to about 100,000 mm$^2$/s at 25° C.

Ingredient (B) employed in the method of this invention is also well-known in the art of organosiloxane elastomeric foams. Organohydrogensiloxanes (B) have on average at least 3 silicon-bonded hydrogen atoms per molecule. The remaining valencies of the silicon atoms are satisfied with organic groups selected from alkyl groups having from 1 to 6 carbon atoms e.g. methyl, ethyl and hexyl and phenyl groups. Preferred from cost and availability considerations are organohydrogensiloxanes in which at least 80% and more preferably substantially 100% of the total organic substituents are methyl. The organohydrogensiloxanes (B) may be homopolymers or copolymers, for example they may be polymethylhydrogensiloxanes, trimethylsiloxy-terminated polymethylhydrogensiloxanes, copolymers of dimethylsiloxane, methylhydrogensiloxane and trimethylsiloxane units and copolymers of dimethylsiloxane, methylhydrogensiloxane and dimethylhydrogensiloxane units. Ingredient (B) may comprise a single organohydrogensiloxane or two or more different organohydrogensiloxanes having for example different chain lengths and/or different contents of silicon-bonded hydrogen atoms. The proportion of ingredient (B) employed should be at least sufficient to provide the desired degree of crosslinking during cure and to produce the required amount of hydrogen gas for foaming the mixture. Depending on the type and structure of the organohydrogensiloxanes the proportion required may vary widely. Generally, however, the proportion of (B) will fall within the range from about 5 to about 40 parts by weight per 100 parts by weight of (A).

Platinum catalyst (C) can be any of the known forms effective in promoting the reaction of SiH groups with silicon-bonded alkenyl groups. Such catalysts are also effective in promoting the reaction between the SiH groups and ≡COH in organic alcohols to provide hydrogen as the blowing agent in the foaming process. Known and suitable forms of platinum are well-documented in the literature and include chloroplatinic acid, platinum compounds and complexes of platinum compounds with unsaturated organic compounds or with siloxanes having silicon-bonded groups containing olefinic unsaturation. Examples of platinum catalysts (C) are complexes of platinous halides and olefines such as ethylene, propylene, cylcohexene and styrene, complexes of platinum halides or chloroplatinic acid with divinyltetramethyl disiloxane (see U.S. Pat. No. 3,419,593) and complexes formed by the reaction of chloroplatinic acid, divinyltetramethyldisiloxane and tetramethyldisiloxane. An amount of the platinum catalyst should be present which is effective in promoting the desired reactions. In general an effective amount is that which provides from 5 to 200 parts by weight per million parts of the combined weights of (A) and (B).

Ingredient (D) is an α, ω-diol represented by the general formula HOROH in which R is an alkylene group having from 3 to 7 carbon atoms, for example —CH$_2$CH$_2$CH$_2$—, —(CH$_2$)$_4$—, —CH$_2$CH(CH$_3$)CH$_2$— and —(CH$_2$)$_5$—. Specific examples of the operative diols are 1,3-propanediol, 1,4-butanediol and 1,5-pentanediol; 1,4-butanediol being preferred. Sufficient of (D) should be employed to provide the desired degree of foaming in the mixture. The amount may thus vary between fairly wide limits, for example from 0.1 up to about 8 parts by weight per 100 parts of the combined weights of (A) and (B). However, amounts in the range from 0.2 to 5 parts are usually appropriate for the majority of applications.

Ingredient (E) is a benzene-soluble resinous copolymr containing triorganosiloxy (R'$_3$SiO$_{0.5}$) units and SiO$_2$ units wherein the R' substituents are selected from methyl and vinyl groups, at least 1% and up to 20% of the total R' groups being vinyl. The resinous copolymers therefore contain SiO$_2$ units, trimethylsiloxy units and dimethylvinylsiloxy units, optionally with a small proportion of R'$_2$SiO units. They are known materials and can be prepared according to the method described in, for example U.S. Pat. No. 2 676 182 The ratio of R'$_3$SiO$_{0.5}$ to SiO$_2$ units may vary from about 0.5:1 to about 1:1, preferably from 0.6:1 to 0.8:1. From 10 to 35 parts by weight of (E) are employed per 100 parts of the combined weights of (A) and (B).

In addition to the aforementioned essential ingredients (A) to (E) the foamable composition may contain fillers and/or other optional substances for improving or otherwise modifying the properties of the foamable composition or the cured foam. Such optional substances include for example alcohols such as n-propanol, inhibitors such as acetylenic alcohols and methyl-vinylcyclic siloxanes for delaying the onset of the foaming and curing reaction, pigments and substances which impart flame retardant properties, for example carbon black, iron oxide, cerium hydroxide and zirconium octoate. Fillers may be incorporated into the foamable composition in amounts up to 100 parts or more by weight per 100 parts of the combined weights of (A) and (B). The fillers may be of the extending or reinforcing type and may be for example any one or more of fume or precipitated silicas, fibrous potassium titanate, silicon carbide fibres, carbon fibres, diatomaceous earth, crushed quartz, calcium carbonate, magnesium carbonate, zirconium silicate and titanium dioxide. The filler may be treated if desired, for example by contact with organosilicon compounds such as chlorosilanes, alkoxy silanes, organosiloxanes and silazanes. Preferred fillers are those such as aluminium hydroxide which also contribute to the fire retardant properties of the cured foam.

The method of this invention is carried out by mixing together the ingredients (A) to (E) and any optional ingredients and allowing the mixture to foam and cure. In most cases foaming occurs at normal ambient temperatures (20° to 25° C.) shortly after mixing has commenced. If desired the onset of foaming and curing can be delayed to allow thorough mixing by including an inhibitor in the formulation as referred to hereinabove. Cure of the foamed composition occurs at normal ambient temperatures (20°–27° C.). However, elevated temperatures may be employed to hasten the initial foam/cure step and/or to effect a post cure. Foamed articles of the desired shape can be obtained by placing the foamable mixture in a suitable mould. Alternatively the desired article may be cut from a prefoamed and cured block.

For purposes of storage and transport the compositions employed in this invention are normally provided in two or more packages which are mixed together when required for use.

Foams prepared according to the method of this invention can be employed in a variety of applications, for example for cushioning, gasket formation, sound insulation and sealing voids.

The following Examples, in which Me=methyl, Vi=vinyl, the parts are expressed by weight and viscosities at 25° C. illustrate the invention.

EXAMPLE 1

A first composition (Part A) was prepared by mixing together, employing a domestic food mixer, 29.5 parts of a dimethylvinylsiloxy end-stopped polydimethylsiloxane having a viscosity of approximately 0.05 m$^2$/s (50,000 cS), 10.35 parts of a resin copolymer of Me$_3$SiO$_{0.5}$, Me$_2$ViSiO$_{0.5}$ and SiO$_2$ units having a ratio of triorganosiloxy units to SiO$_2$ units of 0.7:1 and a vinyl content of 1.8 weight percent, 39.85 parts of a dimethylvinylsiloxy end-stopped polydimethylsiloxane (viscosity=0.009 m$^2$/s, 9,000 cS), 13.24 parts of aluminium hydroxide, 1.33 parts of a complex of chloroplatinic acid and divinyltetramethyldisiloxane, 1.72 parts of a grey pigment, 0.19 part of MeVi cyclic siloxane and x parts of a diol or of an alcohol as shown in the Table following.

A second composition (Part B) was similarly prepared by mixing together 54.2 parts of a dimethylvinylsiloxy end-stopped polydi-methylsiloxane (viscosity=approximately 0.05 m$^2$/s), 18.5 parts of the resin copolymer employed in Part A above, 14.6 parts of a resin copolymer having SiH groups (prepared as described in U.S. Pat. No. 4,310,678), 9.1 parts of a trimethylsiloxy end-stopped polymethylhydrogensiloxane and 3.6 parts of a copolymer of Me$_3$SiO$_{0.5}$, Me$_2$SiO and MeHSiO units having on average about 5 MeHSiO and 3 Me$_2$SiO units per molecule.

Equal quantities of Parts A and B were mixed together (hand stirred) and the mixture allowed to foam and cure at room temperature (22° C.). The densities and cell structure of the cured foams were measured and recorded as follows:

| diol/alcohol | X | density (Kg/m$^3$) | structure |
|---|---|---|---|
| 1,4-butanediol | 3.82 | 172 | good/fine cells |
| 1,3-propanediol | 3.23 | 208 | good/fine cells |
| 1,5-pentanediol | 4.41 | 189 | good/fine cells |
| 2-ethyl-1,3-hexanediol | 6.2 | 280* | collapsed/tacky/coarse |
| lauryl alcohol | 15.8 | 204 | coarse/soft |
| n-propanol | 5.1 | 240* | collapsed/tacky/coarse |

*estimated

EXAMPLE 2

The procedure of Example 1 was repeated except that the amount of MeVi cyclic siloxane in Part A was increased to 0.59 part, the resin copolymer having SiH groups was omitted from Part B and the amount of trimethylsiloxy end-stopped polymethylhydrogensiloxane increased to 19.1 parts. The diol component was 1,4-butanediol.

An elastomeric foam was obtained which had a density of 185 kg/m$^3$. Foam of lower density (150–160 kg/m$^3$) was obtainable by mixing Parts A and B by machine.

That which is claimed is:

1. A method for the production of an organosiloxane elastomeric foam exhibiting a density of less than 208 kg./m$^3$, said method comprising mixing together (A) a triorganosiloxy end-blocked polydiorganosiloxane wherein the organic substituents are selected from alkyl and halogen-substituted alkyl groups having from 1 to 6 carbon atoms, phenyl groups and alkenyl groups having from 2 to 6 carbon atoms, there being an average of at least two alkenyl groups per molecule, and at least 80 percent of the total substituents being methyl, (B) an organohydrogensiloxane having an average at least three silicon-bonded hydrogen atoms per molecule and wherein the organic substituents are selected form the group consisting of alkyl groups having from 1 to 6 carbon atoms and the phenyl group, (C) a platinum catalyst in an amount sufficient to provide from 5 to 200 parts by weight of platinum per million parts of the combined weights of (A) and (B), (D) an alpha, omega-diol of the general formula HOROH wherein R represents an alkylene group having from 3 to 7 carbon atoms and (E) from 10 to 35 parts by weight per 100 parts of the combined weights of (A) and (B) of a resinous copolymer containing R'$_3$SiO$^{0.5}$ units and SiO$_2$ units wherein the R' substituents are selected form methyl groups and vinyl groups, at least 1% and up to 20% of the total R' groups being vinyl, and thereafter allowing the mixture to foam and cure.

2. A method as claimed in claim 1 wherein the $\alpha$, $\omega$-diol (D) is employed in an amount of from 0.2 to 5 parts by weight per 100 parts of the combined weights of (A) and (B).

3. A method as claimed in claim 1 wherein the mixture to be foamed also includes a filler.

4. A method as claimed in claim 3 wherein the filler is aluminium hydroxide.

5. A method as claimed in claim 1 wherein the mixture to be foamed also includes an inhibitor for delaying the onset of the foaming and curing reaction.

6. A method as claimed in claim 1 wherein the mixture to be foamed includes a substance which imparts flame retardant properties to the cured foam.

* * * * *